UNITED STATES PATENT OFFICE.

EDWARD N. DICKERSON, JR., OF NEW YORK, N. Y.

PROCESS OF REFRIGERATING AND PRESERVING MEAT AND OTHER ARTICLES.

SPECIFICATION forming part of Letters Patent No. 256,299, dated April 11, 1882.

Application filed March 2, 1882. (No specimens.)

*To all whom it may concern:*

Be it known that I, EDWARD N. DICKERSON, Jr., of the city, county, and State of New York, have invented a new and useful Improvement in Processes of Refrigeration and Preserving Meat and other Articles, of which the following is a full, true, and exact description.

It is well known that putrescible substances may be partially preserved from deterioration or decay by subjecting them to atmospheric air reduced to a low temperature. It is also well known that the decay of putrescible substances may be retarded by subjecting them to the action of certain gases destructive of certain ferment germs—as, for instance, carbonic oxide. Neither of these processes will, however, entirely accomplish the results sought to be obtained. Meat, for instance, cannot be preserved by subjecting the same to air reduced to a low temperature in such a condition as to maintain its natural bloom or appearance. Certain ferments act upon its surface, even at the low temperature proposed, and tend to change its color and destroy it. On the other hand, bodies subjected to the action of preservative gases—such as carbonic-oxide—at their ordinary temperatures, cannot in all instances be successfully preserved. There seem to be two classes of ferments, one of which is destroyed or rendered inactive by cold, but not by carbonic oxide, and the other of which is destroyed or rendered inactive by carbonic oxide, but not by cold.

I have discovered that almost absolute preservation of putrescible bodies can be accomplished by subjecting them to the influence of carbonic-oxide or similar decay-preventing gas reduced to an abnormally low temperature.

In carrying out my invention practically I take carbonic oxide and nitrogen, preferably that prepared and purified according to the patents of C. F., A. W., and A. L. Lawton, dated May 17, 1881, No. 241,677, for process of preserving organic substances, and June 7, 1881, No. 242,546, for preserving purposes, and then subject those gases to refrigeration in a compression and expansion apparatus, preferably such as is patented to J. J. Coleman, April 6, 1880, No. 226,281, although other apparatuses might be used. I consider it important, however, to use an apparatus which will deposit out of the gas any superfluous moisture which it may contain.

In place of using such apparatus for producing cold by power, I might use natural refrigerants—such as ice. In this case I prefer that the preservative gas should not come in direct contact with the ice, but should be refrigerated by passing through a system of tubes chilled by ice. These tubes might be so arranged as to cause a natural circulation, or a blower might be employed for insuring a forced circulation of the gas through the refrigerating-chamber. The gas might be brought into direct contact with the ice, as in the well-known Lyman refrigerator; but I prefer the other forms shown.

In employing either of the above methods a supply of the gas should be provided in an independent chamber, which can be used to constantly maintain the gas within the refrigerating-chamber. A certain amount of leakage necessarily occurs, and it is better, though not necessary, to have a pressure within the refrigerating-chamber slightly in excess of the barometric pressure, so as to maintain the purity of the gas in the chamber.

What I claim as my invention, and desire to secure by Letters Patent, is—

1. The process of preserving putrescible bodies which consists in subjecting them to carbonic-oxide or similar decay-preventing gas artificially reduced to a low temperature, substantially as described.

2. The process of preserving putrescible bodies which consists in subjecting them to mechanically-produced currents of carbonic-oxide or similar decay-preventing gas, substantially as described.

3. The process of preserving putrescible bodies which consists in subjecting them to mechanically-produced currents of carbonic-oxide or similar decay-preventing gas artificially reduced to a low temperature, substantially as described.

4. The process of preserving putrescible bodies which consists in subjecting them to carbonic-oxide or similar decay-preventing gas at a greater pressure than the external barometric pressure, said gas being artificially reduced to a low temperature, substantially as described.

E. N. DICKERSON, JR.

Witnesses:
GEO. H. EVANS,
WM. A. POLLOCK.